United States Patent
Tyagi et al.

(10) Patent No.: US 10,299,081 B1
(45) Date of Patent: May 21, 2019

(54) GESTURE PROFILES AND LOCATION CORRELATION

(71) Applicant: Motorola Mobility LLC, Chicago, IL (US)

(72) Inventors: Vivek Kumar Tyagi, Chicago, IL (US); Joseph Vincent Nasti, Chicago, IL (US); Sudhir C. Vissa, Bensenville, IL (US); Douglas Alfred Lautner, Round Rock, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 15/942,083

(22) Filed: Mar. 30, 2018

(51) Int. Cl.
*H04W 4/02* (2018.01)
*H04W 4/029* (2018.01)
*H04B 1/3827* (2015.01)

(52) U.S. Cl.
CPC ............ *H04W 4/029* (2018.02); *H04B 1/385* (2013.01); *H04W 4/025* (2013.01); *H04M 2250/12* (2013.01)

(58) Field of Classification Search
CPC ....... H04W 4/02; H04W 4/023; H04W 4/025; H04W 64/003; H04W 88/02; H04W 4/21; H04W 64/00; G01B 5/008; G01B 11/005; G01B 21/047; G01S 17/42; G01S 13/726; G05D 2201/0213; G06Q 30/0643; G06Q 30/0261
See application file for complete search history.

(56) References Cited

U.S. PATENT DOCUMENTS

2010/0189087 A1* 7/2010 Hara ..................... H04W 48/16 370/338
2016/0313744 A1* 10/2016 Amelio ................... B64C 27/08

* cited by examiner

*Primary Examiner* — Nizar N Sivji
(74) *Attorney, Agent, or Firm* — SBMC

(57) ABSTRACT

In aspects of gesture profiles and location correlation, a mobile device includes a wireless radio system to scan for location data from wireless-enabled devices within communication range of the mobile device. The mobile device implements a profile module to initiate the scan for the location data responsive to motion of the mobile device, and can determine from the location data, location coordinates corresponding to locations of the mobile device before and after the scan. The profile module can determine gesture profiles of gestures corresponding to a location of the mobile device, identify the gestures that occur at the location of the mobile device based on the determined gesture profiles, and correlate the identified gestures of the gesture profiles with the location of the mobile device.

20 Claims, 5 Drawing Sheets

GESTURE PROFILES AND LOCATION CORRELATION

BACKGROUND

Generally, a geo-fenced area can be established as a virtual perimeter around a boundary of any structure or environment, such as a building, an area of a building, a retail store, a warehouse, an airport terminal, a parking lot, an outdoor region, or other type of designated area. For example, an indoor positioning system for a geo-fenced area can be established with a server computing device and wireless devices, commonly referred to as the system anchors that establish the boundary edges of the indoor positioning system. A user may carry an object that is trackable with a wireless tag and/or carry a mobile device into the geo-fenced area, and the various devices may be implemented to communicate in the geo-fenced area using various wireless communication technologies, such as ultra-wideband (UWB), Near Field Communication (NFC), Radio-frequency identification (RFID), Real-time Locating System (RTLS), Bluetooth™, and/or Bluetooth Low Energy (BLE).

Further, a mobile device, such as a smartphone carried into a geo-fenced area, may be used as part of a tracking system with sensors, cameras, and other devices for gesture detection, such as to detect package sorting in a distribution center, inventory control in a warehouse, product handling in a retail environment, use of gym equipment in a gym, baggage handling in an airport environment, and the like. However, gestures that may be attributed to the various activities of package sorting, inventory control, product handling, gym equipment use, baggage handling, etc. are too many in number, and can cause excessive power drain in a smartphone used for gesture pattern detection as part of a tracking system.

BRIEF DESCRIPTION OF THE DRAWINGS

Aspects of gesture profiles and location correlation are described with reference to the following Figures. The same numbers may be used throughout to reference like features and components that are shown in the Figures.

DETAILED DESCRIPTION

Gesture profiles and location correlation is described, and can be implemented to identify gestures based on gesture profiles that correspond to motion of a mobile device at locations of the device. Rather than relying on data from an inertial measurement unit or other sensor data from sensors of a mobile device as a basis to determine gestures, the gesture profiles are identified based on location data, such as location coordinates (e.g., x,y,z-coordinates) of the mobile device in an "always aware location" (AAL) environment, such as in a geo-fenced area, as related to the motion of the mobile device. Aspects of gesture profiles and location correlation can be utilized to determine the meaning of an activity at a particular location, based on the motion of the device and the identified gesture profiles. For example, gestures at a particular location may be attributed to certain activities, such as handling and sorting packages, using gym equipment, stocking inventory, selecting items for purchase, handling airport luggage, and any number of other activities that can be identified as having a gesture profile at a particular location. Generally, a determination of gesture profiles of gestures related to the movements of a person can be based on the corresponding motion of a mobile device or wearable article that moves with the person, such as in an AAL environment in which a person is working, shopping, traveling through, and the like.

While features and concepts of gesture profiles and location correlation can be implemented in any number of different devices, systems, environments, and/or configurations, aspects of gesture profiles and location correlation are described in the context of the following example devices, systems, and methods.

Figure 1:
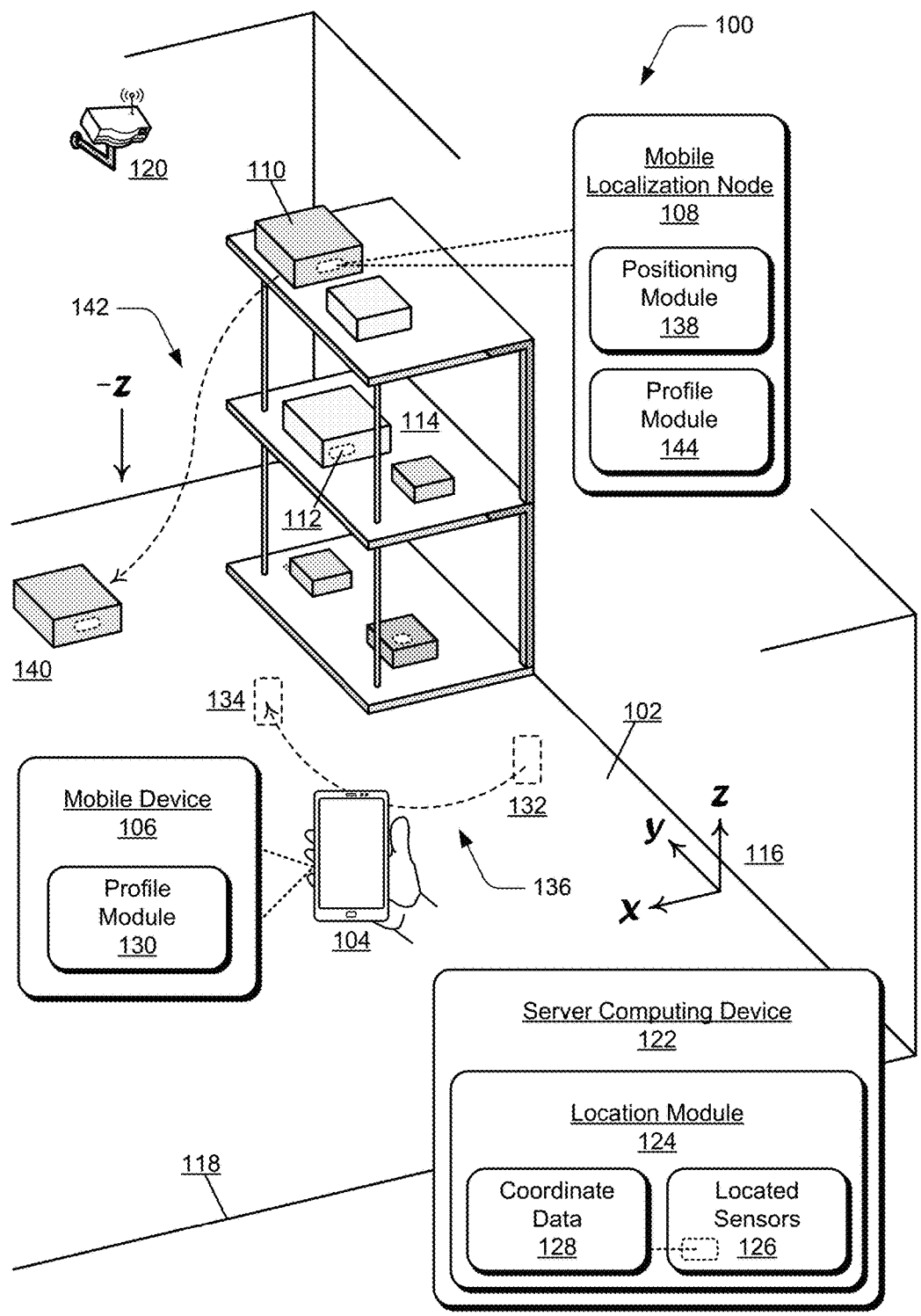
FIG. 1 illustrates an example environment in which aspects of gesture profiles and location correlation can be implemented.

FIG. 1 illustrates an example environment 100 in which aspects of gesture profiles and location correlation can be implemented. The example environment 100 is representative of any indoor or outdoor region or environment that is established as an always aware location (AAL) environment 102, such as a geo-fenced area in a building, an area of a building, a warehouse, an airport terminal, a parking lot, an outdoor region, or other type of designated area or environment. An AAL environment designated by a geo-fenced area is generally established as a virtual perimeter around a boundary of any structure or environment, and in this example, the AAL environment 102 is a virtual perimeter within the boundaries of a building, such as a warehouse or retail store, in which objects are stored and/or displayed. Generally, the AAL environment 102 is established as a two-dimensional area based on x,y-coordinates relative to a horizontal plane of the environment.

A person may enter the building (and into the AAL environment 102), such as any type of retail store that a person may enter looking for an item to purchase, a warehouse that a person may enter looking for a stocked item, a library where a person may browse magazines and borrow reading material, or any other type of environment that a person might visit while carrying a mobile phone 104. Aspects of gesture profiles and location correlation can be implemented to identify gestures based on gesture profiles that correspond to motion of a mobile device at locations of the device. The gesture profiles are identified based on location data, such as x,y,z-coordinates of the mobile device, as related to the motion of the mobile device. Further, aspects of gesture profiles and location correlation can be utilized to determine the meaning of an activity at a particular location, based on the motion of the device and the identified gesture profiles. For example, gestures at a particular location may be attributed to certain activities, such as handling and sorting packages, using gym equipment, stocking inventory, selecting items for purchase, handling airport luggage, and any number of other activities that can be identified as having a gesture profile. Generally, a determination of gesture profiles of gestures related to the movements of a person can be based on the corresponding motion of a mobile device or wearable article that moves with the person, such as in an AAL environment in which a person is working, shopping, traveling through, and the like.

In the example AAL environment 102, the mobile phone 104 is an example of any type of mobile device 106, such as a tablet device, a wearable device, or a wearable article. Generally, the mobile device 106 is any type of an electronic and/or computing device implemented with various components, such as a processing system and memory, as well as any number and combination of different components as further described with reference to the example device shown in FIG. 5. Details of the mobile device 106 are further shown and described with reference to FIG. 2 that illustrates an example 200 of the mobile device 106 in context of the example environment 100. The terms "person" and "user" are generally used herein interchangeably, where a person with the mobile phone 104 is also the user of the mobile phone in the environment of the AAL environment 102.

As a retail store or warehouse, the AAL environment 102 can include any number of inventoried items, objects, and/or products for storage or purchase, each of which can be identified and tracked with a mobile localization node 108. Generally, a mobile localization node is a small electronic tag or label that can process and/or store data and other information in memory on the mobile localization node, and the mobile localization node 108 can be associated with any type of object or item, such as by being placed in or affixed to an object for inventory tracking, item location, item recovery, and the like. In this example, the mobile localization node 108 is associated with (e.g., is attached to) an item 110 that is located in the AAL environment 102 on a top shelf of a shelving unit. Similarly, a mobile localization node 112 is associated with an item 114 that is located in the AAL environment 102 on a middle shelf of the shelving unit. Each of the items in the AAL environment can be located and/or tracked based on x,y,z-coordinates 116 within the boundaries 118 of the environment.

Generally, the mobile localization nodes, such as the mobile localization node 108, can be implemented as any type of an electronic and/or computing device implemented with various components, such as a processing system and memory, as well as any number and combination of different components as further described with reference to the example device shown in FIG. 5. Details of the mobile localization node 108 are further shown and described with reference to FIG. 3 that illustrates an example system 300, which includes the mobile localization node 108 in context of the example environment 100. The mobile localization node 108 can include a memory that stores identifying data of the item 110, which the mobile localization node is associated with, as well as a unique identifier of the particular mobile localization node 108 and may include any other type of metadata, such as location data that indicates a location or region of the item 110 in the AAL environment 102.

Additionally, the mobile localization nodes may be implemented as any type of wireless-radio based tags for various different radio-based, wireless signaling, such as with LTE, Near Field Communication (NFC), Real-time Locating System (RTLS), radio frequency identification (RFID), Bluetooth™ devices, and the like. In this example, the AAL environment 102 may also include Internet-of-things (IoT) network devices, Wi-Fi connected devices 120, and/or additional mobile devices. The IoT devices in the AAL environment 102 may also include motion sensors, surveillance cameras, monitoring devices, control devices, and any other type of networked computing and/or electronic devices that wirelessly communicate in the environment.

In this example, the AAL environment 102 includes a server computing device 122 that facilitates setup and wireless communications in the environment. The server computing device 122 implements a location module 124, which may include independent processing, memory, and logic components functioning as a computing and/or electronic device integrated with the server computing device 122. Alternatively or in addition, the location module 124 can be implemented as a software application or software module, such as computer-executable software instructions that are executable with a processor or processing system of the server computing device. As a software application, the location module 124 can be stored on computer-readable storage memory, or with any suitable memory device or electronic data storage implemented with the server computing device. In implementations, the server computing device 122 may be part of a business server system that is associated with the building, warehouse, retail store, or other environment for which the AAL environment 102 is established.

The mobile phone 104, other mobile devices 106, and mobile localization nodes 108 that are carried into or placed in the AAL environment 102 may be registered as devices for communication with the server computing device 122 of a business server system. Alternatively, the mobile phone 104, other mobile devices 106, and mobile localization nodes 108 may be previously registered for communication between the devices and with the server computing device 122, such as via the Wi-Fi connected device 120 in the environment of the AAL environment 102. Further, the mobile phone 104, other mobile devices 106, mobile localization nodes 108, and other types of wireless communication devices may be setup to self-detect entry into the AAL environment 102. Alternatively or in addition, the location module 124 of the server computing device 122 can detect entry of the mobile phone 104, other mobile devices 106, and mobile localization nodes 108 into the environment.

Generally, the location module 124 is implemented to locate and track the wireless communication devices in one-dimension or two-dimensions in the AAL environment 102, which is designated by the coordinates 116 relative to a horizontal plane of the environment. As used herein, the term "localization nodes" that are located in the AAL environment 102 include any of the mobile phone 104, other mobile devices 106, the mobile localization nodes 108, and any other wireless communication devices, wireless-radio based tags, sensors, and/or devices that include or implement wireless-radio based tags or sensors. The location module 124 can track the located nodes 126 and communicate coordinate data 128 to the located nodes 126, which in this example, includes the mobile phone 104, other mobile devices 106, and the mobile localization node 108 in the AAL environment 102.

Figure 2:
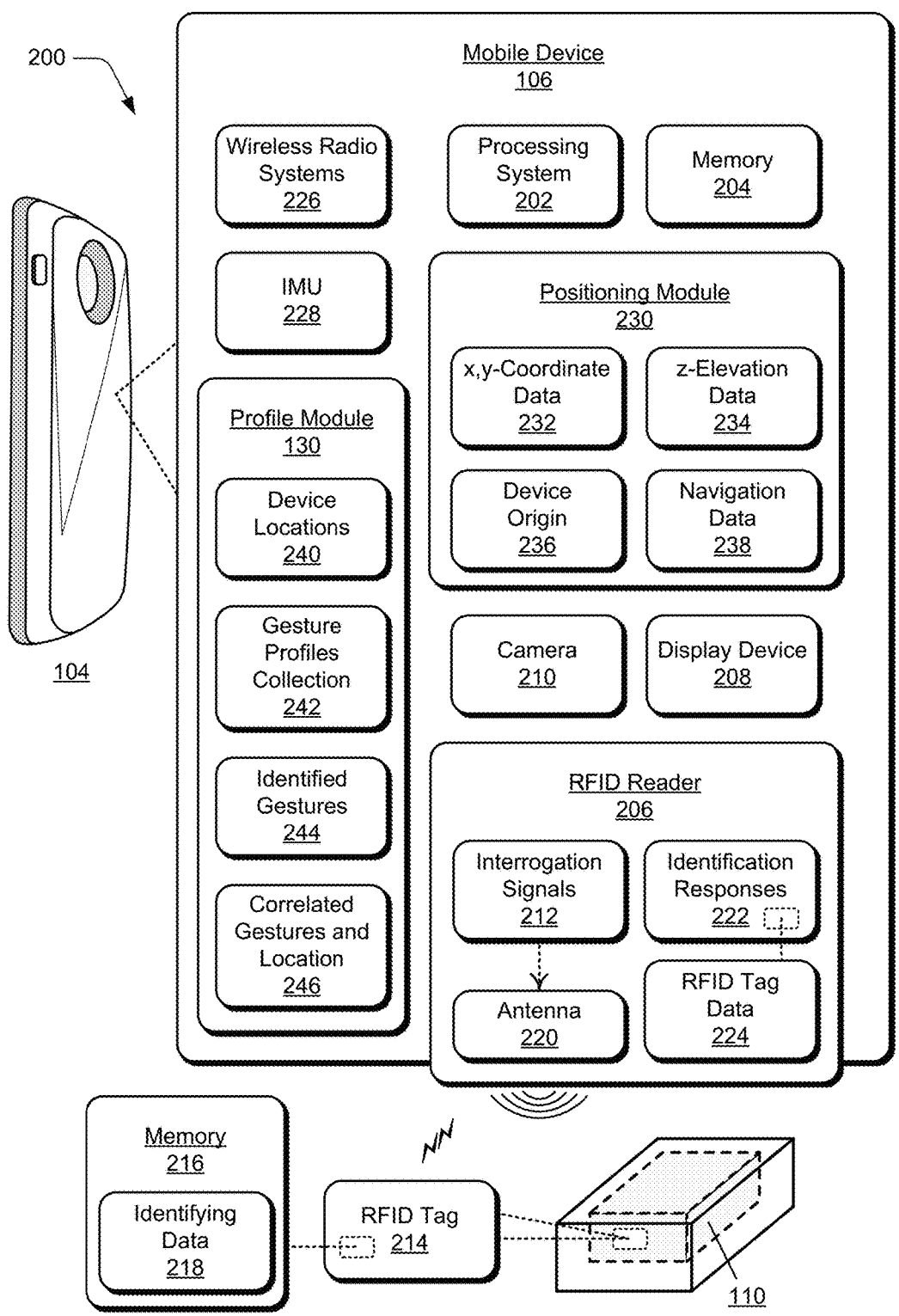
FIG. 2 further illustrates an example mobile device implemented in the example environment in which aspects of gesture profiles and location correlation can be implemented.

The mobile device 106, such as the example mobile phone 104, includes a profile module 130 that implements aspects of gesture profiles and location correlation. With reference to FIG. 2, the profile module 130 may include independent processing, memory, and logic components functioning as a computing and/or electronic device integrated with the mobile device 106. Alternatively or in addition, the profile module 130 can be implemented as a software application or software module, such as computer-executable software instructions that are executable with a processor or processing system 202 of the mobile device 106. As a software application, the profile module 130 can be stored on computer-readable storage memory (e.g., device memory 204), or with any suitable memory device or electronic data storage implemented with the mobile device 106.

The mobile device 106 is representative of any type of a tablet device, a wearable device or wearable article, or the mobile phone 104 that includes a radio frequency identification (RFID) reader 206, either as an integrated component of the mobile device 106 or as an attachment that operates with the mobile device. Generally, the mobile device 106 is any type of an electronic and/or computing device implemented with various components, such as the processing system 202 and the memory 204, as well as any number and combination of different components as further described with reference to the example device shown in FIG. 5. For example, the mobile device 106 can include a power source to power the device, such as a rechargeable battery and/or any other type of active or passive power source that may be implemented in an electronic and/or computing device. The mobile device 106 can also include an integrated display device 208 and a camera 210.

The RFID reader 206 can communicate interrogation signals 212 to any number of RFID tags, such as the RFID tag 214. In implementations, the mobile localization node 108 described herein may be implemented as a RFID tag, which has RFID tag memory 216 that stores identifying data 218 as a unique identifier of the particular RFID tag, as well as data that identifies the respective tagged item 110 associated with the RFID tag. The RFID tag 214 is implemented for two-way wireless communication with the RFID reader 206 (also referred to as a RFID interrogator) that interrogates the RFID tag 214 for the identifying data 218 stored in the RFID tag memory 216. The RFID reader 206 can transmit the interrogation signals 212 via an antenna 220 (or antenna system) as broadcast messages requesting RFID tags that are in communication range to return the tag data stored in memory of the RFID tags. The antenna 220 may be a directional antenna or an omnidirectional antenna, usable by the RFID reader 206 to transmit the interrogation signals 212.

The RFID tag 214 can receive an interrogation signal 212 from the RFID reader 206 and then wirelessly communicate the identifying data 218 back to the RFID reader via a radio frequency (RF) communication channel, which the RFID reader 206 receives as identification responses 222. The identification responses 222 from the RFID tag 214 include the RFID tag data 224 (e.g., the identifying data 218, unique identifier of the RFID tag, and/or other metadata) stored in the RFID tag memory 216. Generally, the RFID tag 214 includes a RFID antenna and a RF interface as a transceiver for two-way communication with the RFID reader 206. The identification responses 222 received by the RFID reader 206 from the RFID tag 214 can be communicated using low frequency (LF), high frequency (HF), or ultra-high frequency (UHF) radio waves.

In addition to the RFID implementation, the mobile device 106 can include one or more different wireless radio systems 226, such as for Wi-Fi, Bluetooth™, Mobile Broadband, LTE, Near Field Communication (NFC), Real-time Locating System (RTLS), or any other wireless radio system or format for communication via respective wireless networks. Generally, the mobile device 106 implements the wireless radio systems 226 that each include a radio device, antenna, and chipset implemented for cellular, wireless, and/or other network communication with other devices, networks, and services. A wireless radio system 226 can be configured to implement any suitable communication protocol or standard for communication via any type of communication and data network (or combination of networks). Although features and aspects of gesture profiles and location correlation are described and illustrated in the context of RFID tags in this example, the described features and aspects can be implemented with various radio-based, wireless tag signaling, such as with LTE, NFC, RTLS, Bluetooth™ devices, and the like.

In this example, the mobile device 106 includes an inertial measurement unit 228, which may include various sensors, such as a gyroscope, an accelerometer, and/or other types of motion sensors. The inertial measurement unit 228 is implemented to sense motion and movement of the mobile device as a user moves and changes orientations of the device and/or as the device moves with the user to various different locations. The various sensors of the inertial measurement unit 228 generate sensor data vectors having three-dimensional parameters (e.g., rotational vectors in x, y, and z coordinates) indicating position, location, and/or orientation of the mobile device 106. As described with reference to a positioning module 230 of the mobile device, the positioning module 230 is implemented to self-track the navigation of the mobile device 106 within the AAL environment 102 based on rotational vector data in three dimensions from the inertial measurement unit 228 of the mobile device.

In aspects of gesture profiles and location correlation, the positioning module 230 of the mobile device 106 can receive the x,y-coordinate data 232 corresponding to the mobile device from the server computing device 122, which has located the mobile device 106 as one of the located nodes 126 in the AAL environment 102. The mobile localization node 108 can receive the coordinate data 128 as one or two initial coordinates of the mobile device 106 at a current location in the AAL environment. For example, the positioning module 230 of the mobile device 106 may receive the initial location coordinate data as an x-coordinate or as x,y-coordinates corresponding to the location of the mobile device in the AAL environment.

The positioning module 230 of the mobile device 106 can then determine (or has previously determined) one or more additional coordinates of the mobile device in the AAL environment 102, such as from the inertial measurement unit 228. For example, the positioning module 230 can determine y,z-coordinate data or z-elevation data 234 that corresponds to the mobile device 106, which is located in the AAL environment 102. The positioning module 230 of the mobile device 106 can then correlate the one or two initial coordinates (e.g., the x-coordinate or the x,y-coordinates) received from the server computing device 122 with the one or more additional coordinates (e.g., the z-elevation data 234) determined by the positioning module for the mobile device, such as based on a common timestamp for the x,y,z-coordinates.

The positioning module 230 of the mobile device 106 can designate a device origin 236 of the mobile device 106 within the AAL environment 102 based on a combination of the correlated coordinates (e.g., the x,y,z-coordinates that have been correlated) and that correspond to the location of the mobile device in the environment. The device origin 236 can be set at (0,0,0), or any other coordinates relative to the location or position of the mobile device 106 in the AAL environment 102. Initially, the sensors of the inertial measurement unit 228 do not have a frame of reference to know where the mobile device is located in the environment. However, the correlation of the x,y,z-coordinates provides a dead-reckoning from which to track the navigation of the mobile device 106 in the AAL environment 102 based on the rotational vectors from the inertial measurement unit sensors. The positioning module 230 can determine a delta z from the device origin 236 as the z-elevation data 234 that corresponds to the mobile device 106 located in the AAL environment 102.

The positioning module 230 is implemented to then self-track navigation of the mobile device 106 in the AAL environment 102 in three dimensions based on updates to the correlated coordinates (e.g., the x,y,z-coordinates) as the mobile device moves (or is moved) from the device origin 236 to subsequent locations within the environment. For example, a person may carry the mobile device 106 around with them in the building environment that is the AAL environment 102. The positioning module 230 generates and updates the navigation data 238 as the positioning module self-tracks the navigation of the mobile device 106 within the AAL environment 102. Notably, the self-tracking navigation of the mobile device by the positioning module 230 can be implemented without communication to the server computing device 122, and without receiving updated coordinate data 128 from the server computing device. As noted above, this saves device power that would otherwise be utilized for the ongoing device updates to and from the location module 124 of the server computing device.

Alternatively or in addition, the positioning module 230 of the mobile device 106 may also receive updated coordinate data 128 from the server computing device 122 as the mobile device moves within the AAL environment 102. The positioning module 230 can utilize the received, updated x,y-coordinate data, as well as determine updated z-coordinates of the mobile device 106 as the device moves within the AAL environment 102. The positioning module 230 can then track the navigation of the mobile device 106 in three dimensions in the AAL environment 102 based on the updated x,y,z-coordinates that are correlated by a common timestamp.

In aspects of gesture profiles and location correlation, the profile module 130 of the mobile device 106 is implemented to initiate the scan for location data corresponding to the mobile device 106 responsive to motion of the mobile device. For example, as shown in FIG. 1, a user of the mobile phone 104 may be carrying the device in the building environment of the AAL environment 102, and the person may navigate around the shelving unit, such as from an initial, first location 132 of the mobile phone to a subsequent, second location 134 of the mobile phone, as shown at 136. The profile module 130 can initiate a wireless radio system 226 of the mobile device 106 to scan for location data from wireless-enabled devices within communication range of the mobile device, such as the location data (e.g., the coordinate data 128) from the server computing device 122, or the self-tracked navigation data 238 from the positioning module 230 of the mobile device itself. Alternatively or in addition, the profile module 130 of the mobile device 106 may communicate with the mobile localization node 108 and receive location data corresponding to the mobile localization node in the AAL environment 102 relative to the location of the mobile device.

The profile module 130 can then determine, from the location data, location coordinates (e.g., x,y,z-coordinates) corresponding to device locations 240 of the mobile device before and after the scan for the location data. In implementations, the location coordinates corresponding to the device location 240 of the mobile device 106 before the scan can be buffered in the memory 204 as a portion of the location data, and the profile module 130 can obtain the buffered portion of the location data to determine the device locations 240 of the mobile device, relative to the detected motion of the mobile device.

The profile module 130 can download, and/or may have downloaded and stored in memory, a collection 242 of gesture profiles, and the profile module can determine gesture profiles of gestures corresponding to the device location 240 of the mobile device 106. For example, the profile module 130 can determine a gesture profile based on a transition of the mobile device 106 from the location coordinates before the scan to the location coordinates after the scan. The location coordinates corresponding to the device locations 240 of the mobile device indicate the gesture profiles of the gestures, as determined by the profile module 130. The profile module 130 can identify the gestures (e.g., as the identified gestures 244) that occur at the device location 240 of the mobile device 106 based on the determined gesture profiles. The profile module 130 can then correlate the identified gestures 244 of the gesture profiles with the device location 240 of the mobile device 106, as the correlated gestures and location 246.

In other aspects, the profile module 130 can determine whether an identified gesture 244 that is correlated with the device location 240 of the mobile device 106 is an expected gesture or an unexpected gesture occurring at the location. The profile module 130 can also identify one or more aspects of the device location 240 of the mobile device based on the identified gestures 244 that are correlated with the device location. For example, the profile module 130 can determine the aspects of the device location as a type of the location, a description of the location, events or actions that occur at the location, and the like. Similarly, the profile module 130 can determine a physical feature about the device location 240 of the mobile device 106 based on the identified gestures 244 that are correlated with the device location.

Figure 3:
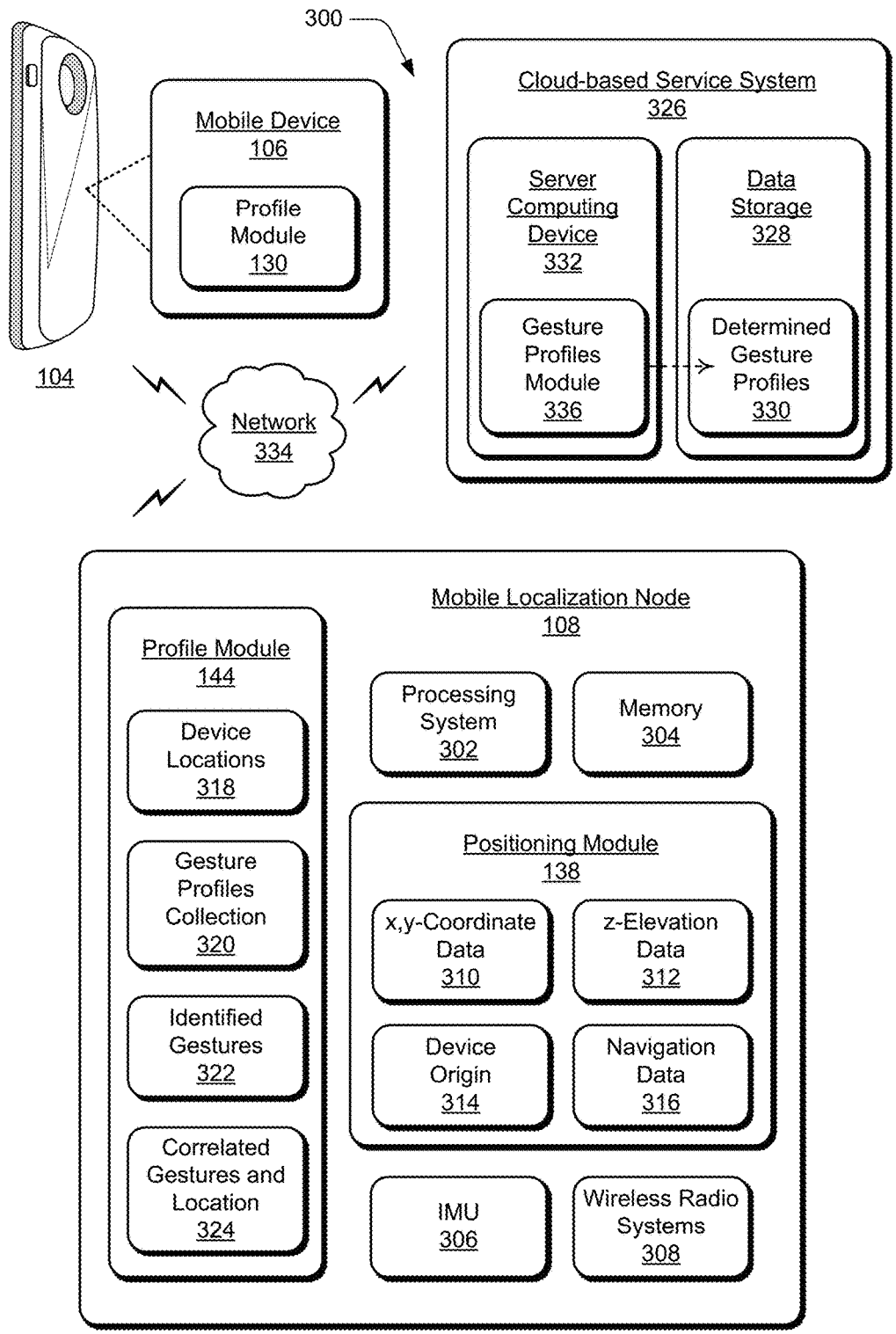
FIG. 3 further illustrates an example mobile localization node implemented in an example environment in which aspects of gesture profiles and location correlation can be implemented.

In the example environment 100, the mobile localization node 108 includes a positioning module 138 that can also implement aspects of gesture profiles and location correlation, as described herein. With reference to FIG. 3, the positioning module 138 of the mobile localization node 108 may include independent processing, memory, and logic components functioning as a computing and/or electronic device integrated with the mobile localization node 108. Alternatively or in addition, the positioning module 138 can be implemented as a software application or software module, such as computer-executable software instructions that are executable with a processor or processing system 302 of the mobile localization node 108. As a software application, the positioning module 138 can be stored on computer-readable storage memory (e.g., device memory 304), or with any suitable memory device or electronic data storage implemented with the mobile localization node 108.

In this example, the mobile localization node 108 includes an inertial measurement unit 306, which may include various sensors, such as a gyroscope, an accelerometer, and/or other types of motion sensors to sense motion and movement of the mobile localization node 108. The various sensors of the inertial measurement unit 306 generate sensor data vectors having three-dimensional parameters (e.g., rotational vectors in x, y, and z coordinates) indicating position, location, and/or orientation of the mobile localization node 108. Similar to the positioning module 230 of the mobile device 106, the positioning module 138 of the mobile localization node 108 is implemented to self-track the navigation of the mobile localization node 108 within the AAL environment 102 based on rotational vector data in three dimensions from the inertial measurement unit 306 of the mobile localization node.

The mobile localization node 108 can also include one or more different wireless radio systems 308, such as for Wi-Fi, Bluetooth™, Mobile Broadband, LTE, Near Field Communication (NFC), Real-time Locating System (RTLS), or any other wireless radio system or format for communication via respective wireless networks. Generally, the mobile localization node 108 implements the wireless radio systems 308 that each include a radio device, antenna, and chipset implemented for cellular, wireless, and/or other network communication with other devices, networks, and services. A wireless radio system 308 can be configured to implement any suitable communication protocol or standard.

In aspects of gesture profiles and location correlation, the positioning module 138 of the mobile localization node 108 can receive the coordinate data 310 corresponding to the mobile localization node from the server computing device 122, which has located the mobile localization node 108 as one of the located nodes 126 in the AAL environment 102. The positioning module 138 of the mobile localization node 108 can receive the coordinate data 310 as one or two initial coordinates of the mobile localization node 108 at a current location in the AAL environment. For example, the mobile localization node 108 may receive the location coordinate data as an x-coordinate or as x,y-coordinates corresponding to the location of the mobile localization node in the AAL environment.

The positioning module 138 of the mobile localization node 108 can then determine (or has previously determined) one or more additional coordinates of the mobile localization node in the AAL environment 102, such as from the inertial measurement unit 306 of the mobile localization node. For example, the positioning module 138 can determine y,z-coordinate data or z-elevation data 312 that corresponds to the item 110, which is located in the AAL environment 102 on the top shelf of the shelving unit. The positioning module 138 of the mobile localization node 108 can then correlate the one or two initial coordinates (e.g., the x-coordinate or the x,y-coordinates) received from the server computing device 122 with the one or more additional coordinates (e.g., the z-elevation data 312) determined by the positioning module for the mobile localization node, such as based on a common timestamp for the x,y,z-coordinates. The positioning module 138 of the mobile localization node 108 can also designate a device origin 314 of the mobile localization node 108 within the AAL environment 102 based on a combination of the correlated coordinates (e.g., the x,y,z-coordinates that have been correlated) and that correspond to the location of the mobile localization node in the environment.

The positioning module 138 is implemented to then self-track navigation of the mobile localization node 108 in the AAL environment 102 in three dimensions based on updates to the correlated coordinates (e.g., the x,y,z-coordinates) as the mobile localization node moves (or is moved with the item 110) from the device origin 314 to subsequent locations within the environment. For example, the item 110 may be moved from the top shelf of the shelving unit down in a direction of −z elevation to the floor at a different location 140 of the building room, such as shown at 142. The positioning module 138 generates and updates the navigation data 316 as the positioning module self-tracks the navigation of the mobile localization node 108 within the AAL environment 102. Notably, the self-tracking navigation of the mobile localization node 108 by the positioning module 138 can be implemented without communication to the server computing device 122, and without receiving updated coordinate data 128 from the server computing device 122. In implementations, this saves device power that would otherwise be utilized for the ongoing device updates to and from the location module 124 of the server computing device.

Alternatively or in addition, the positioning module 138 of the mobile localization node 108 may also receive updated coordinate data 128 from the server computing device 122 as the mobile localization node moves within the AAL environment 102. The positioning module 138 can utilize the received, updated x,y-coordinate data, as well as determine updated z-coordinates of the mobile localization node 108 as the mobile localization node moves (or is moved with the item 110) within the AAL environment 102. The positioning module 138 can then track the navigation of the mobile localization node 108 in three dimensions in the AAL environment 102 based on the updated x,y,z-coordinates that are correlated by a common timestamp.

In this example, the mobile localization node 108 can also include a profile module 144, similar to the profile module 130 implemented in the mobile device 106. Similarly, the profile module 144 of the mobile localization node 108 is implemented to determine, from location data corresponding to the mobile localization node, locations of the mobile localization node before the motion of the mobile localization node and after the motion of the mobile localization node. For example, as described above with reference to FIG. 1, the item 110 may be moved from the initial, first location on the top shelf of the shelving unit to the subsequent, second location 140 in the building room, such as shown at 142. The profile module 144 can initiate a wireless radio system 308 of the mobile localization node 108 to scan for location data from wireless-enabled devices within communication range of the mobile localization node, such as the location data (e.g., the coordinate data 128) from the server computing device 122, or the self-tracked navigation data 316 from the positioning module 138 of the mobile localization node itself. Alternatively or in addition, the profile module 144 of the mobile localization node 108 may communicate with the mobile device 106 and receive location data corresponding to the mobile localization node in the AAL environment 102 relative to the location of the mobile device.

The profile module 144 can then determine, from the location data, location coordinates (e.g., x,y,z-coordinates) corresponding to device locations 318 of the mobile localization node before and after the scan for the location data. In implementations, the location coordinates corresponding to the device location 318 of the mobile localization node 108 before the scan can be buffered in the memory 304 as a portion of the location data, and the profile module 144 can obtain the buffered portion of the location data to determine the device locations of the mobile localization node, relative to the detected motion of the mobile localization node as it is moved with the item 110 in this example.

The profile module 144 can download, and/or may have downloaded and stored in memory, a collection 320 of gesture profiles, and the profile module can determine gesture profiles of gestures corresponding to the device location 318 of the mobile localization node 108. For example, the profile module 144 can determine a gesture profile based on a transition of the mobile localization node 108 from the location coordinates before the scan to the location coordinates after the scan. The location coordinates corresponding to the device locations 318 of the mobile localization node indicate the gesture profiles of the gestures, as determined by the profile module 144. The profile module 144 can identify the gestures (e.g., as the identified gestures 322) that occur at the device location 318 of the mobile localization node 108 based on the determined gesture profiles. The profile module 144 can then correlate the identified gestures 322 of the gesture profiles with the device location 318 of the mobile localization node 108, as the correlated gestures and location 324.

In other aspects, the profile module 144 can determine whether an identified gesture 322 that is correlated with the device location 318 of the mobile localization node 108 is an expected gesture or an unexpected gesture occurring at the location. The profile module 144 can also identify one or more aspects of the device location 318 of the mobile localization node based on the identified gestures 322 that are correlated with the device location. For example, the profile module 144 can determine the aspects of the device location as a type of the location, a description of the location, events or actions that occur at the location, and the like. Similarly, the profile module 144 can determine a physical feature about the device location 318 of the mobile localization node 108 based on the identified gestures 322 that are correlated with the device location.

This example system 300 also includes a cloud-based service system 326 that can implement features of gesture profiles and location correlation, as described herein. The cloud-based service system 326 can be accessed on-line by the mobile device 106 and/or the mobile localization node 108, and includes a data storage 328 that maintains a database of determined gesture profiles 330. The cloud-based service system 326 can include a server computing device 332, which is representative of one or more hardware server devices (e.g., computing devices) that may be implemented at the cloud-based service system. The server computing device 332 of the cloud-based service system 326 can include memory and a processor, and may be implemented with any number and combination of different components as further described with reference to the example device shown in FIG. 5.

Any of the server, computing, and/or mobile devices, as well as the mobile localization nodes, described herein can communicate via any type of communication and data network 334 (or combination of networks), such as for data communication between the mobile phone 104, the mobile localization node 108, other mobile devices, the Wi-Fi connected device 120, the server computing device 122 of the AAL environment 102, and/or the server computing device 332 of the cloud-based service system 326. The network 334 can be implemented to include a wired and/or wireless network, may be implemented using any type of network topology and/or communication protocol, and can be represented or otherwise implemented as a combination of two or more networks, to include cellular networks, IP-based networks, and/or the Internet. The network 334 may also include mobile operator networks that are managed by a network provider of a cellular network, a mobile network operator, and/or other network operators, such as a communication service provider, mobile phone provider, and/or Internet service provider.

In this example system 300, the server computing device 332 of the cloud-based service system 326 implements a gesture profiles module 336, such as in software, in hardware, or as a combination of software and hardware components. The gesture profiles module 336 may be implemented as a software application or module, such as executable software instructions (e.g., computer-executable instructions) that are executable with a processing system of the server computing device 332. The gesture profiles module 336 can be stored on computer-readable storage media, such as any suitable memory device or electronic data storage implemented in the server computing device 332 and/or at the cloud-based service system 326. The cloud-based service system 326 may include multiple data storage, server devices, and applications, and can be implemented with various components as further described with reference to the example device shown in FIG. 5.

The server computing device 332 implements the gesture profiles module 336, such as for machine-based learning, to collect and identify the determined gesture profiles 330 that represent gestures as repeated patterns collected from smartphones (e.g., mobile devices 106). A collection of determined gestures can be mapped to an indoor location, such as in the designated AAL environment 102, and the gesture profiles module 336 can categorize the gestures based on the environment, and based on activities that occur within the environment. The gesture profiles module 336 can generate a list or collection of the most common gesture profiles 330 associated with the AAL environment 102, and the determined gesture profiles 330 can be downloaded to the mobile device 106 and/or to the mobile localization node 108.

Example method 400 is described with reference to FIG. 4 in accordance with implementations of gesture profiles and location correlation. Generally, any services, components, modules, methods, and/or operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 4:
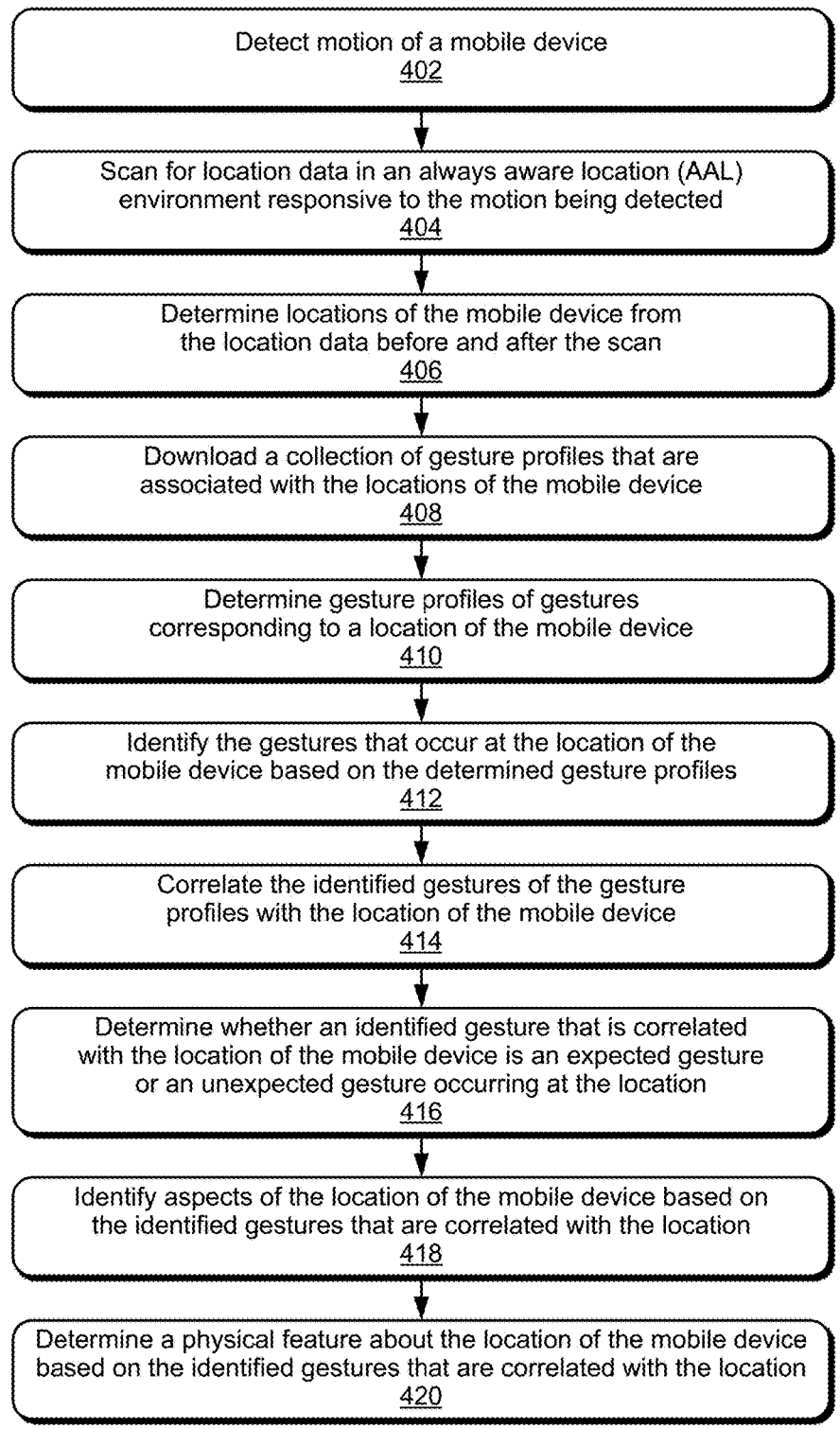
FIG. 4 illustrates example method(s) of gesture profiles and location correlation in accordance with techniques described herein.

FIG. 4 illustrates example method(s) 400 of gesture profiles and location correlation as described herein, and the method is generally described with reference to a profile module implemented in a mobile device. The order in which the method is described is not intended to be construed as a limitation, and any number or combination of the described method operations can be performed in any order to perform a method, or an alternate method.

At 402, motion of a mobile device is detected. For example, the mobile device 106, such as the mobile phone 104 or a wearable article, includes the inertial measurement unit 228 that detects motion of the mobile device, such as when a person carries the mobile device 106 around with them in the building environment that is the AAL environment 102. The positioning module 230 of the mobile device 106 generates and updates the navigation data 238 as the positioning module self-tracks the navigation of the mobile device 106 within the AAL environment 102.

At 404, location data is scanned for in an always aware location (AAL) environment responsive to the motion being detected. For example, the mobile device 106 includes a wireless radio system 226 that scans for location data from wireless-enabled devices within communication range of the mobile device, such as the location data (e.g., the coordinate data 128) from the server computing device 122, or the self-tracked navigation data 238 from the positioning module 230 of the mobile device itself. Alternatively or in addition, the profile module 130 of the mobile device 106 communicates with the mobile localization node 108 and receives location data corresponding to the mobile localization node in the AAL environment 102 relative to the location of the mobile device.

At 406, locations of the mobile device are determined from the location data before and after the scan. For example, the profile module 130 that is implemented by the mobile device 106 determines locations (e.g., based on x,y,z-coordinates) of the mobile device from the location data before and after the scan, and the location data corresponding to the locations of the mobile device indicates gesture profiles of gestures that correlate to the motion of the mobile device.

At 408, a collection of gesture profiles that are associated with the locations of the mobile device are downloaded. For example, the profile module 130 that is implemented by the mobile device 106 downloads, and/or may have downloaded and stored in memory, the gesture profiles collection 242, such as the determined gesture profiles 330 downloaded from the server computing device 332 of the cloud-based service system 326.

At 410, gesture profiles of gestures corresponding to a location of the mobile device are determined. For example, the profile module 130 that is implemented by the mobile device 106 determines gesture profiles of gestures corresponding to a device location 240 of the mobile device, such as determining a gesture profile based on a transition of the mobile device 106 from the device location 132 in the AAL environment 102 before the scan to the device location 134 in the environment after the scan. In implementations, the location coordinates (e.g., the x,y,z-coordinates) corresponding to the device location 240 of the mobile device 106 before the scan are buffered in the memory 204 as a portion of the location data, and the profile module 130 obtains the buffered portion of the location data to determine the device locations 240 of the mobile device, relative to the detected motion of the mobile device.

At 412, the gestures that occur at the location of the mobile device are identified based on the determined gesture profiles, and at 414, the identified gestures of the gesture profiles are correlated with the location of the mobile device. For example, the profile module 130 that is implemented by the mobile device 106 identifies the gestures (e.g., as the identified gestures 244) that occur at the device location 240 of the mobile device based on the determined gesture profiles. The profile module 130 then correlates the identified gestures 244 of the gesture profiles with the device location 240 of the mobile device 106, as the correlated gestures and location 246.

At 416, an identified gesture that is correlated with the location of the mobile device is determined as an expected gesture or an unexpected gesture occurring at the location. For example, the profile module 130 that is implemented by the mobile device 106 determines whether an identified gesture 244 that is correlated with the device location 240 of the mobile device 106 is an expected gesture or an unexpected gesture occurring at the location.

At 418, aspects of the location of the mobile device are identified based on the identified gestures that are correlated with the location, and at 420, a physical feature about the location of the mobile device is determined based on the identified gestures that are correlated with the location. For example, the profile module 130 that is implemented by the mobile device 106 identifies one or more aspects of the device location 240 of the mobile device based on the identified gestures 244 that are correlated with the device location. The aspects of the device location may be determined as a type of the location, a description of the location, events or actions that occur at the location, and the like. Similarly, the profile module 130 determines a physical feature about the device location 240 of the mobile device 106 based on the identified gestures 244 that are correlated with the device location.

Figure 5:
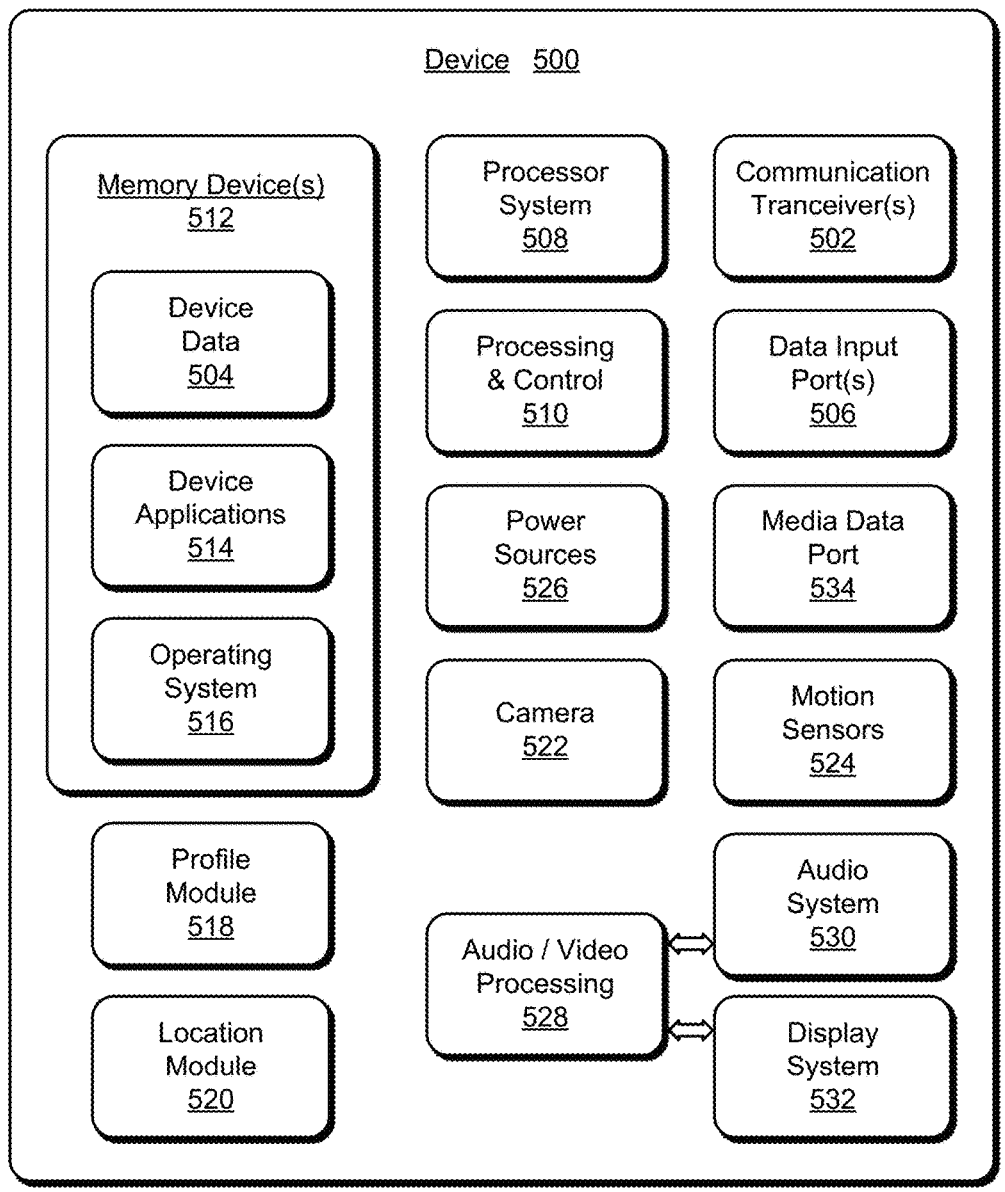
FIG. 5 illustrates various components of an example device that can implement aspects of gesture profiles and location correlation.

FIG. 5 illustrates various components of an example device 500 in which aspects of gesture profiles and location correlation can be implemented. The example device 500 can be implemented as any of the devices described with reference to the previous FIGS. 1-4, such as any type of mobile device, mobile localization node, mobile phone, client device, wearable device, tablet, computing, communication, entertainment, gaming, media playback, and/or other type of electronic device. For example, the server computing device 122, the mobile device 106, and the mobile localization node 108 shown and described with reference to FIGS. 1-4 may be implemented as the example device 500. Further a wearable device may include any one or combination of a watch, armband, wristband, bracelet, glove or pair of gloves, glasses, jewelry items, clothing items, any type of footwear or headwear, and/or other types of wearable articles.

The device 500 includes communication transceivers 502 that enable wired and/or wireless communication of device data 504 with other devices. The device data 504 can include any of the coordinate data, navigation data, device location data, and gesture profiles data. Additionally, the device data 504 can include any type of audio, video, and/or image data. Example communication transceivers 502 include wireless personal area network (WPAN) radios compliant with various IEEE 802.15 (Bluetooth™) standards, wireless local area network (WLAN) radios compliant with any of the various IEEE 802.11 (WiFi™) standards, wireless wide area network (WWAN) radios for cellular phone communication, wireless metropolitan area network (WMAN) radios compliant with various IEEE 802.16 (WiMAX™) standards, and wired local area network (LAN) Ethernet transceivers for network data communication.

The device 500 may also include one or more data input ports 506 via which any type of data, media content, and/or inputs can be received, such as user-selectable inputs to the device, messages, music, television content, recorded content, and any other type of audio, video, and/or image data received from any content and/or data source. The data input ports may include USB ports, coaxial cable ports, and other serial or parallel connectors (including internal connectors) for flash memory, DVDs, CDs, and the like. These data input ports may be used to couple the device to any type of components, peripherals, or accessories such as microphones and/or cameras.

The device 500 includes a processing system 508 of one or more processors (e.g., any of microprocessors, controllers, and the like) and/or a processor and memory system implemented as a system-on-chip (SoC) that processes computer-executable instructions. The processor system may be implemented at least partially in hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively or in addition, the device can be implemented with any one or combination of software, hardware, firmware, or fixed logic circuitry that is implemented in connection with processing and control circuits, which are generally identified at 510. The device 500 may further include any type of a system bus or other data and command transfer system that couples the various components within the device. A system bus can include any one or combination of different bus structures and architectures, as well as control and data lines.

The device 500 also includes computer-readable storage memory 512 (e.g., memory devices) that enable data storage, such as data storage devices that can be accessed by a computing device, and that provide persistent storage of data and executable instructions (e.g., software applications, programs, functions, and the like). Examples of the computer-readable storage memory 512 include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage media in various memory device configurations. The device 500 may also include a mass storage media device.

The computer-readable storage memory 512 provides data storage mechanisms to store the device data 504, other types of information and/or data, and various device applications 514 (e.g., software applications). For example, an operating system 516 can be maintained as software instructions with a memory device and executed by the processing system 508. The device applications may also include a device manager, such as any form of a control application, software application, signal-processing and control module, code that is native to a particular device, a hardware abstraction layer for a particular device, and so on.

In this example, the device 500 includes a profile module 518 that implements aspects of gesture profiles and location correlation, and may be implemented with hardware components and/or in software as one of the device applications 514, such as when the device 500 is implemented as the mobile device 106 or as the mobile localization node 108 shown and described with reference to FIGS. 1-4. Examples of the profile module 518 are the profile module 130 that is implemented as a software application and/or as hardware components of the mobile device 106, and the profile module 144 that is implemented as a software application and/or as hardware components of the mobile localization node 108. In implementations, the profile module 518 may include independent processing, memory, and logic components as a computing and/or electronic device integrated with the device 500.

The device 500 also includes a location module 520 that implements aspects of gesture profiles and location correlation, and may be implemented with hardware components and/or in software as one of the device applications 514, such as when the device 500 is implemented as the server computing device 122 shown and described with reference to FIGS. 1-4. An example of the location module 520 is the location module 124 that is implemented as a software application and/or as hardware components in the server computing device 122. In implementations, the location module 520 may include independent processing, memory, and logic components as a computing and/or electronic device integrated with the device 500.

In this example, the device 500 also includes a camera 522 and motion sensors 524, such as may be implemented in an inertial measurement unit (IMU). The motion sensors 524 can be implemented with various sensors, such as a gyroscope, an accelerometer, and/or other types of motion sensors to sense motion of the device. The various motion sensors 524 may also be implemented as components of an inertial measurement unit in the device. The example device 500 can also include one or more power sources 526, such as when the device is implemented as a mobile device. The power sources may include a charging and/or power system, and can be implemented as a flexible strip battery, a rechargeable battery, a charged super-capacitor, and/or any other type of active or passive power source.

The example device 500 also includes an audio and/or video processing system 528 that generates audio data for an audio system 530 and/or generates display data for a display system 532. The audio system and/or the display system may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, such as media data port 534. In implementations, the audio system and/or the display system are integrated components of the example device. Alternatively, the audio system and/or the display system are external, peripheral components to the example device.

Although aspects of gesture profiles and location correlation have been described in language specific to features and/or methods, the subject of the appended claims is not necessarily limited to the specific features or methods described. Rather, the specific features and methods are disclosed as example implementations of gesture profiles and location correlation, and other equivalent features and methods are intended to be within the scope of the appended claims. Further, various different embodiments are described and it is to be appreciated that each described embodiment can be implemented independently or in connection with one or more other described embodiments. Additional aspects of the techniques, features, and/or methods discussed herein relate to one or more of the following embodiments.

A mobile device, comprising: a wireless radio system to scan for location data from wireless-enabled devices within communication range of the mobile device; a profile module to: initiate the scan for the location data responsive to motion of the mobile device; determine, from the location data, location coordinates corresponding to locations of the mobile device before and after the scan; determine one or more gesture profiles of gestures corresponding to a location of the mobile device; identify the gestures that occur at the location of the mobile device based on the determined one or more gesture profiles; and correlate the identified gestures of the one or more gesture profiles with the location of the mobile device.

Alternatively or in addition to the above described mobile device, any one or combination of: the profile module is configured to download a collection of the gesture profiles from which the one or more gesture profiles of gestures are determined. The mobile device is a wearable article, and the location coordinates corresponding to the locations of the wearable article indicates the one or more gesture profiles of the gestures. The profile module is configured to determine a gesture profile based on a transition of the mobile device from the location coordinates before the scan to the location coordinates after the scan. The location coordinates corresponding to the location of the mobile device before the scan are buffered in memory as a portion of the location data, and wherein the profile module is configured to obtain the buffered portion of the location data to determine the one or more gesture profiles of gestures corresponding to the location of the mobile device. The profile module is configured to identify one or more aspects of the location of the mobile device based on the identified gestures that are correlated with the location. The profile module is configured to determine a physical feature about the location of the mobile device based on the identified gestures that are correlated with the location. The profile module is configured to determine whether an identified gesture that is correlated with the location of the mobile device is an expected gesture or an unexpected gesture occurring at the location. The profile module is configured to detect a gesture based on subsequent motion of the mobile device, and initiate a subsequent scan by the wireless radio system.

A method, comprising: detecting motion of a mobile device; scanning for location data in an always aware location (AAL) environment responsive to the motion being detected; determining locations of the mobile device from the location data before and after the scan; determining one or more gesture profiles of gestures corresponding to a location of the mobile device; identifying the gestures that occur at the location of the mobile device based on the determined one or more gesture profiles; and correlating the identified gestures of the one or more gesture profiles with the location of the mobile device.

Alternatively or in addition to the above described method, any one or combination of: the method further comprising downloading a collection of the gesture profiles from which the one or more gesture profiles of gestures are determined. The mobile device is a wearable article, and the location data corresponding to the locations of the wearable article indicates the one or more gesture profiles of the gestures. A gesture profile is determined based on a transition of the mobile device from the location in the AAL environment before the scan to the location in the AAL environment after the scan. The method further comprising: buffering the location data corresponding to the location of the mobile device before the scan in memory as a portion of the location data; and obtaining the buffered portion of the location data to determine the locations of the mobile device before and after the scan. The method further comprising identifying one or more aspects of the location of the mobile device based on the identified gestures that are correlated with the location. The method further comprising determining a physical feature about the location of the mobile device based on the identified gestures that are correlated with the location. The method further comprising determining whether an identified gesture that is correlated with the location of the mobile device is an expected gesture or an unexpected gesture occurring at the location.

A mobile device, comprising: an inertial measurement unit to detect motion of the mobile device; a profile module to: determine, from location data, locations of the mobile device before the motion and after the motion; determine one or more gesture profiles of gestures corresponding to a location of the mobile device; identify the gestures that occur at the location of the mobile device based on the determined one or more gesture profiles; and correlate the identified gestures of the one or more gesture profiles with the location of the mobile device.

Alternatively or in addition to the above described mobile device, any one or combination of: the profile module is configured to determine the one or more gesture profiles based on a transition of the mobile device from location coordinates in an always aware location (AAL) environment before the detected motion to location coordinates of the mobile device in the AAL environment after the detected motion. The mobile device is a wearable article, and the locations of the wearable article corresponding to the motion of the wearable article indicates the one or more gesture profiles of the gestures.

The invention claimed is:

1. A mobile device, comprising:
   a wireless radio system to scan for location data from wireless-enabled devices within communication range of the mobile device;
   a positioning module to self-track navigation of the mobile device and determine, from the location data, location coordinates corresponding to a location of the mobile device;
   a profile module to:
      initiate the scan for the location data by the wireless radio system responsive to motion of the mobile device;
      receive the location coordinates corresponding to the location of the mobile device from the positioning module;
      determine one or more gesture profiles of gestures corresponding to the location of the mobile device;
      identify the gestures that occur at the location of the mobile device based on the determined one or more gesture profiles;
      correlate the identified gestures of the one or more gesture profiles with the location of the mobile device; and
      determine a type of the location of the mobile device and an action that occurs at the location based on the identified gestures that are correlated with the location.

2. The mobile device as recited in claim 1, wherein the profile module is configured to download a collection of the gesture profiles from which the one or more gesture profiles of gestures are determined.

3. The mobile device as recited in claim 1, wherein the mobile device is a wearable article, and the location coordinates corresponding to the location of the wearable article indicates the one or more gesture profiles of the gestures.

4. The mobile device as recited in claim 1, wherein the profile module is configured to determine a gesture profile based on a transition of the mobile device from the location coordinates before the scan to the location coordinates after the scan.

5. The mobile device as recited in claim 1, wherein the location coordinates corresponding to the location of the mobile device before the scan are buffered in memory as a portion of the location data, and wherein the positioning module is configured to obtain the buffered portion of the location data to determine the location coordinates corresponding to the location of the mobile device.

6. The mobile device as recited in claim 1, wherein the profile module is configured to identify one or more aspects of the location of the mobile device based on the identified gestures that are correlated with the location.

7. The mobile device as recited in claim 1, wherein the profile module is configured to determine a physical feature about the location of the mobile device based on the identified gestures that are correlated with the location.

8. The mobile device as recited in claim 1, wherein the profile module is configured to determine whether an identified gesture that is correlated with the location of the mobile device is an expected gesture or an unexpected gesture occurring at the location.

9. The mobile device as recited in claim 1, wherein the profile module is configured to detect a gesture based on subsequent motion of the mobile device, and initiate a subsequent scan by the wireless radio system.

10. A method, comprising:
   detecting motion of a mobile device by an inertial measurement unit of the mobile device;
   scanning for location data in an always aware location (AAL) environment responsive to the motion being detected;
   determining a location of the mobile device from the location data by a positioning module executed by a processor of the mobile device;
   executing a profile module by the processor of the mobile device, the profile module performing:
      determining one or more gesture profiles of gestures corresponding to the location of the mobile device;
      identifying the gestures that occur at the location of the mobile device based on the determined one or more gesture profiles;
      correlating the identified gestures of the one or more gesture profiles with the location of the mobile device; and
      determining an action that occurs at the location of the mobile device and whether an identified gesture that is correlated with the location is an expected gesture or an unexpected gesture based on the action occurring at the location.

11. The method as recited in claim 10, further comprising downloading a collection of the gesture profiles from which the one or more gesture profiles of gestures are determined.

12. The method as recited in claim 10, wherein the mobile device is a wearable article, and the location data corresponding to the location of the wearable article indicates the one or more gesture profiles of the gestures.

13. The method as recited in claim 10, wherein a gesture profile is determined based on a transition of the mobile device from the location in the AAL environment before the scan to the location in the AAL environment after the scan.

14. The method as recited in claim 10, further comprising:
   buffering the location data corresponding to the location of the mobile device before the scan in memory as a portion of the location data; and
   obtaining the buffered portion of the location data to determine the locations of the mobile device before and after the scan.

15. The method as recited in claim 10, further comprising identifying one or more aspects of the location of the mobile device based on the identified gestures that are correlated with the location.

16. The method as recited in claim 10, further comprising determining a physical feature about the location of the mobile device based on the identified gestures that are correlated with the location.

17. A mobile device, comprising:
   an inertial measurement unit to detect motion of the mobile device;
   a positioning module to self-track navigation of the mobile device and determine a location of the mobile device;
   a profile module to:
      receive the location of the mobile device from the positioning module;
      determine one or more gesture profiles of gestures corresponding to the location of the mobile device;
      identify the gestures that occur at the location of the mobile device based on the determined one or more gesture profiles;
      correlate the identified gestures of the one or more gesture profiles with the location of the mobile device; and
      determine one or more aspects about the location of the mobile device based on the identified gestures that are correlated with the location, the one or more aspects about the location including a type of the location and an event that occurs at the location of the mobile device.

18. The mobile device as recited in claim 17, wherein the profile module is configured to determine the one or more gesture profiles based on a transition of the mobile device from location coordinates in an always aware location (AAL) environment before the detected motion to location coordinates of the mobile device in the AAL environment after the detected motion.

19. The mobile device as recited in claim 17, wherein the mobile device is a wearable article, and the location of the wearable article corresponding to the motion of the wearable article indicates the one or more gesture profiles of the gestures.

20. The mobile device as recited in claim 17, wherein the profile module is configured to determine whether an identified gesture that is correlated with the location of the mobile device is an expected gesture or an unexpected gesture occurring at the location.

* * * * *